United States Patent [19]

Asai

[11] Patent Number: 4,795,127
[45] Date of Patent: Jan. 3, 1989

[54] MOLD ASSEMBLY OF INJECTION-MOLDING MACHINE

[75] Inventor: Ikuo Asai, Nagoya, Japan

[73] Assignee: Kabushikik Kaisha Meiki Seisakusho, Aichi, Japan

[21] Appl. No.: 98,361

[22] Filed: Sep. 18, 1987

[30] Foreign Application Priority Data

Sep. 27, 1986 [JP] Japan ................. 61-228978
Mar. 13, 1987 [JP] Japan ................. 62-59850

[51] Int. Cl.$^4$ ................. B29C 33/30; B29C 45/34
[52] U.S. Cl. ................. 249/103; 249/141; 249/164; 249/167; 425/190; 425/542; 425/405.1; 425/810
[58] Field of Search ................. 264/107, 101, 102; 425/810, 405.1; 249/160, 163, 164, 167, 103, 141

[56] References Cited

U.S. PATENT DOCUMENTS

| | | | |
|---|---|---|---|
| Re. 31,235 | 5/1983 | McNeely et al. | 425/810 |
| 1,915,357 | 6/1933 | Fernberg | 425/810 |
| 3,315,302 | 4/1967 | Phillipson et al. | 425/810 |
| 3,894,825 | 7/1975 | Westermann | 425/810 |
| 3,932,097 | 1/1976 | Press | 425/810 |
| 4,374,636 | 2/1983 | Holmes | 425/589 |
| 4,409,169 | 10/1983 | Bartholdsten et al. | 425/810 |

FOREIGN PATENT DOCUMENTS

| | | | |
|---|---|---|---|
| 43-12018 | 5/1968 | Japan | 425/810 |
| 890417 | 2/1962 | United Kingdom | 264/107 |

*Primary Examiner*—Willard Hoag
*Attorney, Agent, or Firm*—Parkhurst, Oliff & Berridge

[57] ABSTRACT

A mold assembly for an injection-molding machine for molding a disc, including a stationary die, a movable die movable relative to the stationary die, a stamper which is retained at least at an outer peripheral portion thereof on the movable die and which has information signals recorded thereon, and an outer retainer ring for retaining the stamper on the movable die at the outer peripheral portion. The stationary die, stamper and outer retainer ring cooperate to define a mold cavity, so that the disc is molded of a resin material injected into the cavity, such that the information signals are reproduced on one surface of the molded disc. The mold assembly has an annular void in which an outer peripheral edge of the outer peripheral portion of the stamper is accommodated without contact with the movable die and the outer retainer ring. The mold assembly may further have a suction space which communicates with the annular void, and which is connected to an external suction source, to discharge gases trapped in the mold assembly.

13 Claims, 4 Drawing Sheets

MOLD ASSEMBLY OF INJECTION-MOLDING MACHINE

BACKGROUND OF THE INVENTION

1. Field of the Invention

The present invention relates generally to a mold assembly of an injection-molding machine adapted to mold discs such as optical discs or similar products, and more particularly to improvements in the mold assembly for prtecting a stamper against thermal stressed and gases trapped therein, so as to assure stable molding of the products with excellent quality.

2. Discussion of the Prior Art

A known mold assembly for injection molding of discs such as optical and magnetic discs like audio discs, video discs and memory discs uses a stationary die, and a movable die which incorporates a stamper retainer thereon and which is adapted to move toward and away from the stationary die. The stationary and movable dies cooperate to define a mold cavity corresponding to a profile of the product to be molded cavity, so that information signals recorder on one surface of the stamper are reproduced on a corresponding surface of an injection-molded disc.

In the disc-forming mold assembly of the type indicated above, the stamper which usually takes the form of a doughnut is positioned within the mold cavity such that the outer and inner peripheral portions of the stamper are retained on the movable die by respective retainer rings.

Described more particularly referring to FIGS. 7 and 8, the outer peripheral portion 71 of the stamper 70 is bound by the outer retainer ring 65 provided on the movable die block 60, while the inner peripheral portion of the stamper 70 is similarly bound by the inner retainer ring (not shown). Thus, the stamper 70 is held in position with respect to the movable die block 60.

The movable die block 60 has a mirror surface 61 on which the stamper 70 rests at one of its opposite surfaces. The other surface of the stamper 70 serves as a stamping surface which is accurately formed with information signals recorded thereon.

With the thus arranged movable die block 60 moved to the stationary die block 50, the mold cavity C is defined by the stamper 70, the outer retainer ring 65, and a mirror surface 51 of the stationary die block 50. The resin material is injected into the mold cavity C, whereby a disc is formed such that the information signals on the stamping surface of the stamper 70 are reproduced on one of opposite surfaces of the disc.

The stamper 70 having the information signals recorded thereon is reproduced from a master pattern, by means of a metal electroforming, for example. In an injection molding operation, the metal stamper 70 is heated due to heating of the mold assembly to an adjusted operating temperature, and due to heat of a melt of the injected resin material which fills the mold cavity. Consequently, the stamper 70 undergoes thermal expansion. Further, flows of the molten resin within the cavity C cause the stamper 70 to be subject to a tensile force in the direction parallel to its plane, i.e., in the radially outward direction. Thus, the stamper 70 tends to be elastically elongated or expand in the radially outward direction. To facilitate such thermal expansion and elastic elongation of the stamper 70, there is provided a clearance (indicated at 68 in FIG. 8), usually on the order of several microns, between the stamper 70 and a flange portion 66 of the outer retainer ring 65.

Generally, the periphery of the stamper 70 is shaped by a blanking operation with a punch and die. In this blanking operation, the stamper 70 more or less has a warpage or buckling 73, or burr on its one side, as indicated in FIG. 8, due to the blanking force exerted at its edge. Reference character 81 in FIG. 8 indicates a space provided between the outer periphery of the stamper 70 and the outer retainer ring 65, to accomodate radial expansion of the stamper 70. The warpage 73 at the outer peripheral portion 71 of the stamper 70 prevents a radially outward movement of the stamper 70 when the stamper 70 undergoes thermal expansion and elastic deformation as indicated above. In this condition, the stamper 70 tends to be locally flexed or curved as shown in FIG. 7, and create an air space A between the mirror surface 61 of the movable die block 60 and the corresponding surface of the stamper 70. The air space A undesirably functions as a thermal insulator, and may cause inefficient cooling of the formed resin material at its portion which corresponds to the flexed portion of the stamper 70. Thus, the flexture of the stamper 70 leads to dimensional inaccuracy of the molded optical disc, which may induce optical scanning or reading errors of the disc.

Another problem encountered in the known mold assembly as shown in FIGS. 7 and 8 is derived from gases such as monomer gases which are produced during injection of the resin material into the mold cavity C. More specifically, the gases flow through a small gap between the stamper 70 and the flange portion 66 of the retainer ring 65, and enter into an annular void S1 in which the outer peripheral portion of the stamper 70 is positioned, or an annular void (not shown) in which the inner peripheral portion of the stamper 70 is positioned. When the molded product is removed from the mold assembly, the stamper 70 is pulled a small distance away from the mirror surface 61 of the movable die block 60. At this time, the gases trapped in the above-indicated voids enter between the stamper 70 and the mirror surface 61. As a result, the mirror surface 61 and the corresponding rear surface of the stamper 70 are subject to electrolytic corrosion by the gases.

Since the stamper 70 is a thin plate having a thickness of about 0.25–0.3 mm, corroded areas of the stamper are simulated as corrosion marks on the molded product, and the quality of the product is deteriorated. Where the product is an optical disc, in particular, slight surface strains of the disc have a direct adverse effect on the quality of the disc. For this reason, the stamper 70 and the movable die block 60 of the conventional mold assembly must be cleaned, replaced or re-machined at comparatively short intervals (e.g., every 20,000–30,000 shots).

SUMMARY OF THE INVENTION

It is therefore an object of the present invention to provide an improved structure of a mold assembly for an injection-molding machine for molding discs, which permits accurate molding of the discs with improved quality.

Another object of the invention is to provide such mold assembly wherein a stamper is retained such that a warpage or buckling at the outer peripheral portion of the stamper will not prevent thermal expansion or elastic elongation of the stamper.

The above objects may be achieved according to the present invention, which provides a mold assembly for an injection-molding machine for molding a disc, including a stationary die, a movable die movable relative to the stationary die, a stamper which is retained at least at an outer peripheral portion thereof on the movable die and which has information signals recorded thereon, and an outer retainer ring for retaining the stamper on the movable die at the outer peripheral portion, the stationary die, the stamper and the outer retainer ring cooperating to define a mold cavity, so that the disc is molded of a resin material injected into the mold cavity, such that the information signals are reproduced on one surface of the molded disc, wherein the improvement comprises portions defining an annular void in which an outer peripheral edge of the outer peripheral portion of the stamper is accommodated without contacting the movable die and the outer retainer ring.

In the mold assembly of the invention constructed as described above, the stamper is retained on the movable die, with its outer peripheral edge being kept in spaced-apart relation with the outer retainer ring and the movable die. Namely, the annular void permits smooth thermal expansion and/or elastic deformation of the stamper during an injection molding operation, even if the stamper has a warpage, buckling or burr at its outer peripheral edge. Hence, the stamper is protected from undesirable flexure or bending due to stresses caused by the prevention or restriction of the thermal expansion and/or elastic elongation by the warped or deformed outer edge in contact with the movable die or retainer ring. Thus, the instant mold assembly permits stable molding of the discs with excellent quality.

Further, since the annular void provides a space between the outer peripheral portion of the stamper and the movable die, the stamper can be easily removed off the surface of the movable die for replacement of the stamper or other purposes, even where the stamper tightly adheres to the mirror surface of the movable die.

According to one feature of the invention, the portions defining the annular void include a flange portion of the outer retainer ring for holding the outer peripheral portion of the stamper, and a part of the movable die aligned with the flange portion of the outer retainer ring. In one form of this feature, the flange portion has an annular groove formed in an inner surface thereof facing the above-indicated part of the movable die, while the same part of the movable die has an annular recess which cooperates with the annular groove to define the annular void.

The instant mold assembly may be suitably used for molding optical, magnetic, or other discs.

A further object of the invention is to provide such mold assembly wherein a movable die block and a stamper are protected from corrosion due to gases trapped in the mold cavity during an injection molding operation.

The above object may be attained according to another aspect of the present invention, which provides a mold assembly for an injection-molding machine for molding a disc, including a stationary die, a movable die movable relative to the stationary die, a stamper which is retained at least at an outer peripheral portion thereof on the movable die and which has information signals recorded thereon, and an outer retainer ring for retaining the stamper on the movable die at the outer peripheral portion, the stationary die, the stamper and the outer retainer ring cooperating to define a mold cavity, so that the disc is molded of a resin material injected into the mold cavity, such that the information signals are reproduced on one surface of the molded disc, wherein the improvement comprises portions defining an annular void in which an outer peripheral edge of the outer peripheral portion of the stamper is accommodated without contact with the movable die and the outer retainer ring means for defining a suction space which communicates with the annular void, and means for connecting the suction space to external suction means.

In the mold assembly constructed as described above, gases which are produced within the mold cavity during an injection molding operation can be discharged by the external suction means, through the suction space provided within the mold assembly. Accordingly, the movable die and the stamper are effectively protected from corrosion by the gases otherwise trapped within the mold assembly.

Thus, the mold assembly according to the above aspect of the invention also permits stable molding of the discs with excellent quality. Furthermore, the instant mold assembly assures easy maintenance and increased life expectancy of the movable die and the stamper, whereby the operating efficiency of the injection-molding machine can be effectively improved.

According to one feature of the above aspect of the invention, the suction space includes an annular groove formed in a surface of the movable die on which the stamper is retained, and the means for connecting the suction space to external suction means includes at least one passageway formed through the movable die. In one form of this feature, the annular groove is open in a part of the surface of the movable die such that the annular groove is closed by the outer peripheral portion of the stamper.

In accordance with another feature of the same aspect of the invention, the stamper has a central opening, and the mold assembly further comprises an inner retainer ring for retaining the stamper on the movable die at an inner peripheral portion of the stamper.

In one form of the above feature of the invention, the inner retainer ring comprises a sleeve disposed in a central portion of the movable die, so as to extend through the central opening in the stamper. In this case, the suction space may comprise a circumferential space formed between an outer circumferential surface of the inner retainer ring and an inner circumferential surface of the movable die, so that the circumferential space communicates with an inner periphery of the stamper.

In another form of the above feature of the invention, the suction space comprises an annular groove formed in a surface of the movable die on which the stamper is retained, and may further comprise a circumferential space formed between an outer circumferential surface of the inner retainer ring and an inner circumferential surface of the movable die.

According to a further feature of the same aspect of the invention, the means for connecting the suction space to external suction means comprises at least one passageway formed through the movable die. In the case where the movable die comprises a movable die block on which the stamper is retained, and a movable holder member for holding the movable die block, the above-indicated at least one passageway may include an annular air passage formed at an interface of the movable die block and the movable holder member, and at least one communication hole which communicates with the suction space and the annular air passage.

The mold assembly according to the above aspect of the invention may also be suitably used for molding an optical disc.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
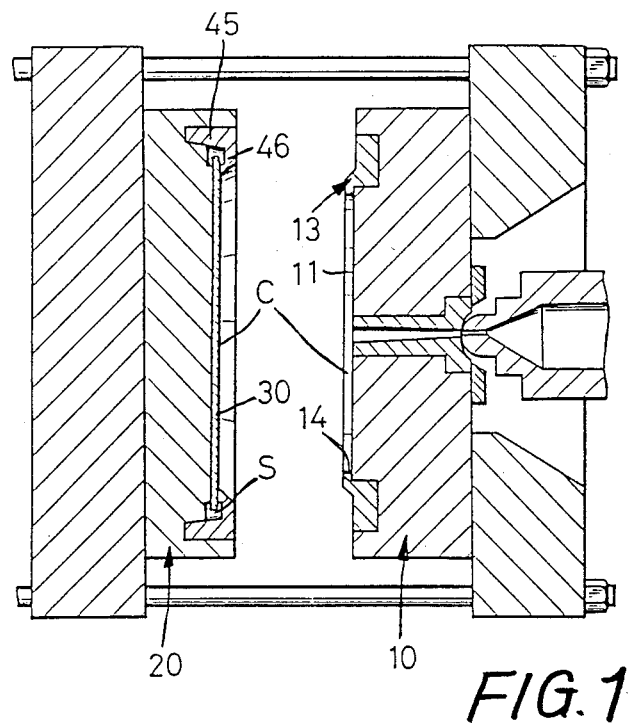
FIG. 1 is an elevational view in cross section of one embodiment of a mold assembly of a disc-forming injection-molding machine of the present invention, which mold assembly incorporates a holder device for retaining a stamper.
Figure 2:
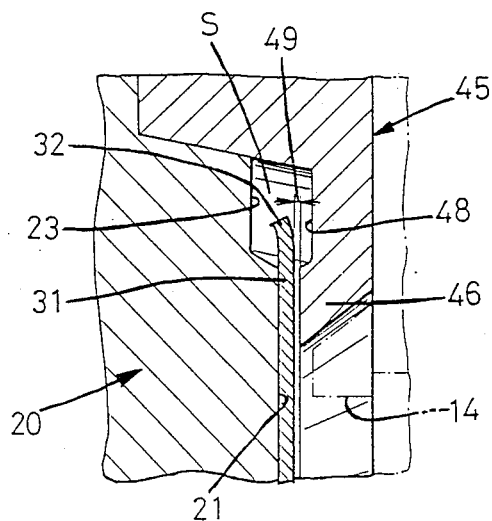
FIG. 2 is an enlarged, fragmentary elevational view in cross section of the mold assembly of FIG. 1.

Referring first to FIG. 1, there is shown a mold assembly of an injection-molding machine for forming discs, wherein the mold assembly is placed in its open position in which two separate dies are spaced apart from each other. The mold assembly has a mold cavity C formed therein. The mold cavity C is defined by a surface 11 of a stationary die 10, an inner circumferential surface 14 of an annular ring member 13, and a stamper 30 retained on a movable die block 20. The surface 11 of the stationary die 10 defines one of opposite major surfaces of a disc to be formed, and the inner circumferential surface 14 of the annular ring member 13 defines the outer periphery of the disc. Further, the stamper 30 defines the other major surface of the disc, that is, a recording surface on which information signals are recorded. As shown in FIG. 2, the stamper 30 is retained at its outer peripheral portion 31 by an annular retainer ring 45 having a holding flange portion 46, such that the stamper 30 is held on a mirror surface 21 formed on the movable die block 20. Reference numeral 49 designates a clearance on the order of microns, left between the flange portion 46 of the retainer ring 45 and the opposite surface of the stamper 30.

As illustrated in FIG. 2, the holding device for retaining the stamper 30 has an annular groove 48 formed in the inner surface of the holding flange portion 46 of the retainer ring 45, so that an outer peripheral edge of the outer peripheral portion 31 of the stamper 30 is kept in spaced-apart relation with the flange portion 46. On the other hand, the movable die block 20 on which the stamper 30 is held by the retainer ring 45 has an annular recess 23, so that the outer peripheral edge 32 is kept in spaced-apart relation with the movable die block 20. In other words, the outer peripheral edge 32 of the stamper 30 retained or fixed within the mold assembly is accommodated in an annular void S which comprises the annular groove and recess 48, 23, so that the edge 32 is kept intact with respect to the retainer ring 45 and the movable die block 20.

Thus, the stamper 30 is retained such that its outer peripheral edge 32 is positioned within the annular space or void 8 defined by the annular groove 48 in the retainer ring 45 and the annular recess 23 in the movable die block 20. This arrangement serves to hold the peripheral edge 32 of the stamper 30 in spaced-apart relation with the surface of the movable die block 20. Accordingly, the outer peripheral edge 32 permits smooth thermal expansion or deformation of the stamper 30, even if the peripheral edge 32 is warped or buckled on one side, or given burrs, upon blanking operation to produce the stamper 30. Namely, the peripheral edge 32 would not contact the surface of the movable die block 20, causing the stamper 30 to be flexed or otherwise deformed due to strains, as experienced in the known mold assembly. Therefore, the instant mold assembly having the annular void 8 eliminates various defects on the discs to be formed, due to strains or deformation of the stamper 30.

The instant arrangement of the mold assembly has another advantage. That is, since the outer peripheral edge 32 of the stamper 30 projects within the void S such that there exists a gap between the peripheral edge 32 and the bottom of the annular recess 23, the stamper 30 may be readily removed off the mirror surface 21, upon replacement of the used stamper 30 with a new one, even where the stamper 30 firmly adheres to the mirror surface 21.

Figure 3:
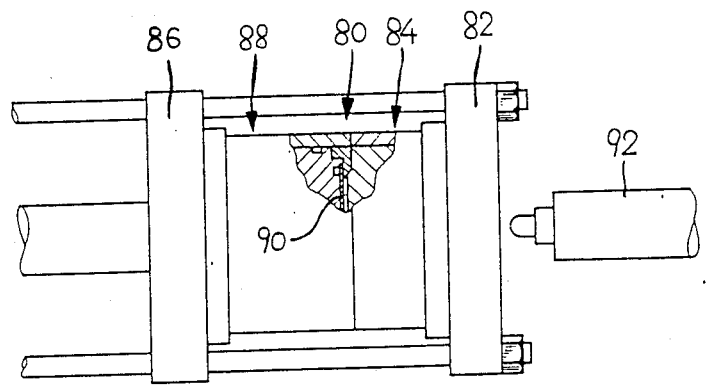
FIG. 3 is a schematic elevational view of a part of a disc-forming injection-molding machine which incorporates another embodiment of the mold assembly according to the invention.
Figure 4:
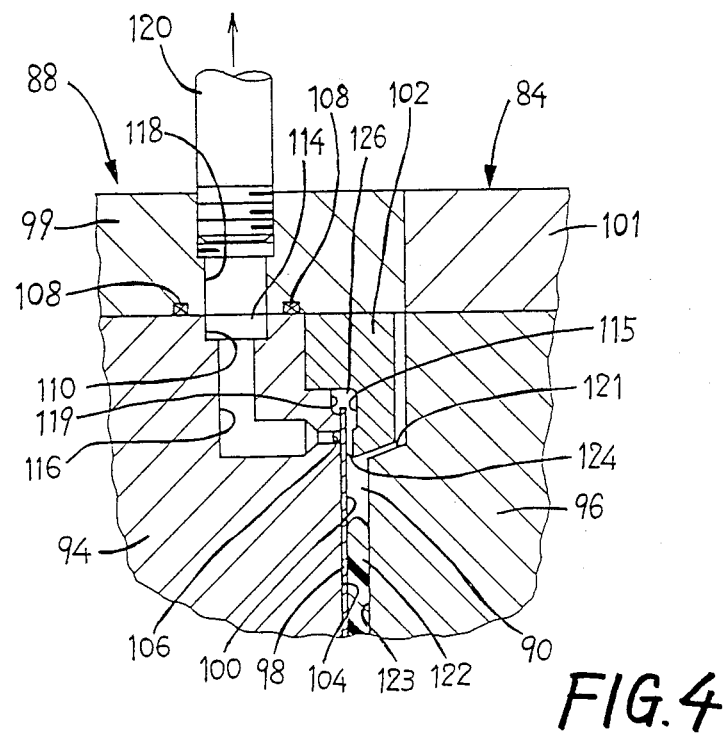
FIG. 4 is an enlarged, fragmentary elevational view in cross section of the mold assembly of FIG. 3.
Figure 5:
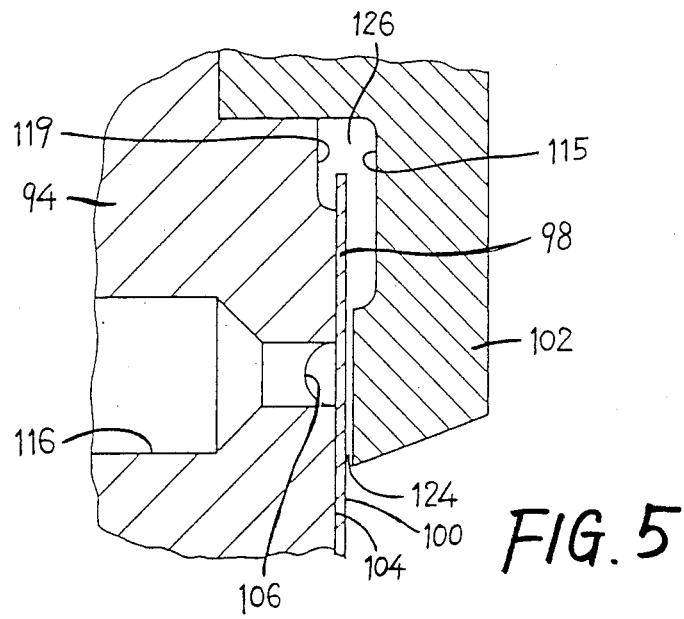
FIG. 5 is an enlarged, fragmentary view in cross section of a part of the mold assembly of FIG. 4.

Referring next to FIGS. 3, 4 and 5, another embodiment of the invention will be described.

In the fragmentary schematic view of FIG. 3, a mold assembly of a disc-forming injection-molding machine is generally indicated at 80. The mold assembly 80 includes a stationary unit 82 with a stationary die 84 secured thereto, and a movable unit 86 with a movable die 88 secured thereto. The movable unit 86 is adapted to be movable toward and away from the stationary unit 82, so that the movable die 88 is moved toward and away from the stationary die 84. The movable die 88 is forced against the stationary die 84 when the movable unit 86 is moved toward the stationary unit 82, as indicated in FIG. 3. In this condition a shaped cavity 90 corresponding to a profile of a disc to be obtained is formed between the stationary and movable dies 84, 88. Reference numeral 92 in FIG. 3 designates an injection device for injecting a suitable material into the mold cavity 90.

Described in greater detail, the movable and stationary dies 88, 84 disposed in mutually opposed relation have a movable die block 94 and a stationary die block 96, respectively, so that opposite mirror surfaces formed on these die blocks 94, 96 define the shaped mold cavity 90, as shown in FIG. 4. The movable and stationary dies 88, 84 further have a movable holder member 99 and a stationary holder member 101, which hold the movable and stationary die blocks 94, 96, respectively. Thus, the movable and stationary dies 88, 84 are constituted.

On the mirror surface 104 of the movable die block 94 opposite to the stationary die block 96, there is retained a doughnut-like or toroidal stamper 98 such that a stamping surface 100 having patterns of depressions representative of information signals communicates with the mold cavity 90. The stamper 98 is positioned within the mold cavity 90 and retained on the movable die 88, such the the inner peripheral portion of the stamper 98 is bound by an inner retainer ring (not shown), and the outer peripheral portion is bound by an outer retainer ring 102. The outer retainer ring 102 is secured to the outer peripheral portion of the movable die block 94 so that the ring 102 is moved with the die block 94.

The mirror surface 104 of the movable die block 94 on which the stamper 98 is retained has a suction space in the form of an annular groove 106 formed along the entire outer periphery of the stamper 98, as indicated in FIGS. 4 and 5. The movable die block 94 further has an outer circumferential groove 110 in its outer circumferential surface. This circumferential groove 110 is closed by the inner surface of the movable holder member 99, whereby the movable die 88 is provided with an internal circumferential air passage 114 formed along its outer circumference. Reference numeral 108 in FIG. 4 indicates O-rings disposed between the movable die block 94 and the holder member 99, and on both sides of the circumferential air passage 114, for providing fluid tightness of the passage 114 at the interface of the die block 94 and the holder member 99.

The annular groove 106 communicates with the circumferential air passage 114 through a plurality of communication holes 116 formed in the movable die block 94, while the movable holder member 99 has a plurality of through holes 118 which communicate with the circumferential air passage 114. The through holes 118 are connected to respective suction pipes 120 which extend from external suction means in the form of a suitable vacuum source (not shown). Thus, the annular groove 106 open in the mirror surface 104 of the movable die block 94 communicates with the external vacuum source, via the communication holes 116, circumferential air passage 114, through holes 118 and suction pipes 120.

On the other hand, the stationary die block 96 of the stationary die 84 has an annular shoulder (annular recess) 121 aligned with the outer retainer ring 102 secured to the movable die block 94. When the movable die 88 is moved toward the stationary die 84, the outer circumferential surface of the outer retainer ring 102 is accommodated within the annular recess 121 in the stationary die block 96, and the stamper 98 is positioned a suitable distance away from the opposite mirror surface 123 on the stationary die block 96. In this condition, the mold cavity 90 is defined by the stationary die block 96, outer retainer ring 102 and stamper 98.

As in the first embodiment of FIGS. 1 and 2, the instant mold assembly also has an annular void or space 126 which comprises an annular groove 115 formed in the outer retainer ring 102, and an annular recess 119 formed in the movable die block 94. This annular void 126 prevents the outer peripheral edge of the stamper 98 from contacting the surface of the movable die block 94, and consequent deformation of the stamper 98, even if the peripheral edge is warped or buckled during blanking operation to produce the stamper 98.

When the injection-molding machine equipped with the instant mold assembly 80 is operated to mold discs, the movable unit 86 is moved toward the stationary unit 82, to form the shaped cavity 90 between the stationary and movable dies 84, 88. Then, a suitable resin material 122 is introduced into the cavity 90. In the meantime, the vacuum source is activated to draw gases from the mold assembly 80, through the annular groove 106 open in the mirror surface 104 of the movable die block 94.

Explained more specifically, monomer gases or other gases are developed during injection of the resin material 122 into the mold cavity 90. These gases flow in the cavity 90 in the radially outward direction, and move through a small gap 124 between the retainer ring 102 and the stamper 98, into the annular void 126 between the retainer ring 102 and the movable die block 94, whereby the outer peripheral portion of the stamper 98 is exposed to the gases in the void 126.

However, when the disc which has been molded is removed from the mold assembly 80, the stamper 98 is pulled by the disc in the direction of removal of the disc, whereby a space is formed between the rear surface of the stamper 98 and the mirror surface 104 of the movable die block 94. Consequently, the gases trapped in the annular void 126 flow into the space behind the stamper 98, which space communicates with the annular groove 106 open in the mirror surface 104, and therefore communicates with the external vacuum source. Accordingly, the gases trapped in the mold assembly 80 are rapidly drawn by the vacuum source and discharged into the atmosphere.

As described above, the instant mold assembly 80 is effectively protected against corrosion of the stamper 98 and the movable die block 94 by the gases produced during injection molding operation, whereby the discs or other products to be formed are effectively protected from undesirable transfer of corrosion marks from the stamper 98, and the deterioration of the products due to the corrosion marks is minimized. Thus, the instant mold assembly 80 allows stable production of the injection-molded products with improved quality, permits easy maintenance and increased durability of the stamper 98 and the movable die block 94, and provides significant improvement in the operating efficiency of the injection-molding machine.

An experimental test was conducted by the present inventor, to produce optical discs on an injection-molding machine which incorporates the instant mold assembly 80. The test confirmed complete absence of significant changes (corrosion) of the stamper 98 and the mirror surface 104 of the movable die block 94, which have adverse effects on the optical discs obtained, even after a continuous run of as many as 500,000 shots. This means a considerable improvement over the conventional arrangement, which requires cleaning operations of the stamper and the movable die block, every about 20,000–30,000 shots of operation of the machine. Further, it was confirmed that the life expectancy of the stamper 98 and the mirror surface 104 of the movable die block 94 in the instant mold assembly 80 was prolonged almost as many as ten times that of the conventional arrangement.

In the mold assembly 80 of the present embodiment, the annular groove 106 which serves as a suction space communicating with an external suction source also functions as a sucker which assures tight adhesion of the stamper 98 to the mirror surface 104 of the movable die block 94. That is, the annular groove 106 open in the mirror surface 104 is closed by the stamper 98, and consequently the stamper 98 is sucked toward the mirror surface 104, by a sucking pressure applied to the closed annular groove 106. Thus, the stamper 98 may be retained on the movable die block 94 without any gases trapped between the mirror surface 104 and the stamper 98. This contributes to further enhancement of the surface accuracy of the discs to be molded.

Figure 6:
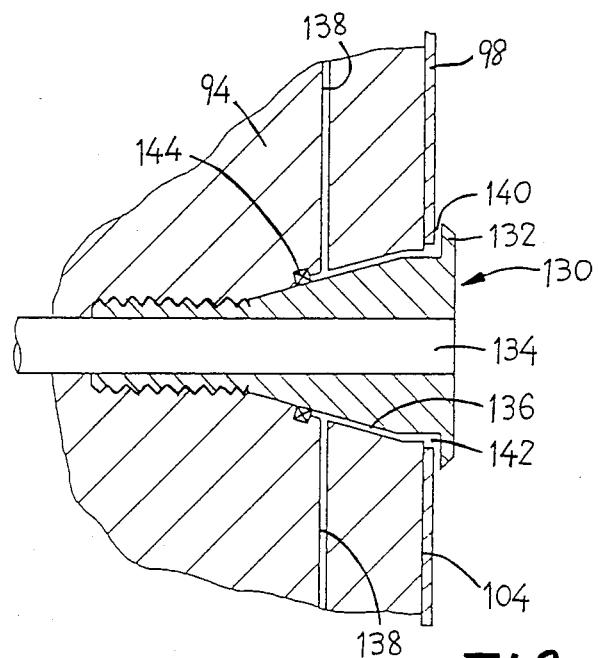
FIG. 6 is an enlarged, fragmentary cross sectional view of a further embodiment of the mold assembly of the invention.
Figure 7:
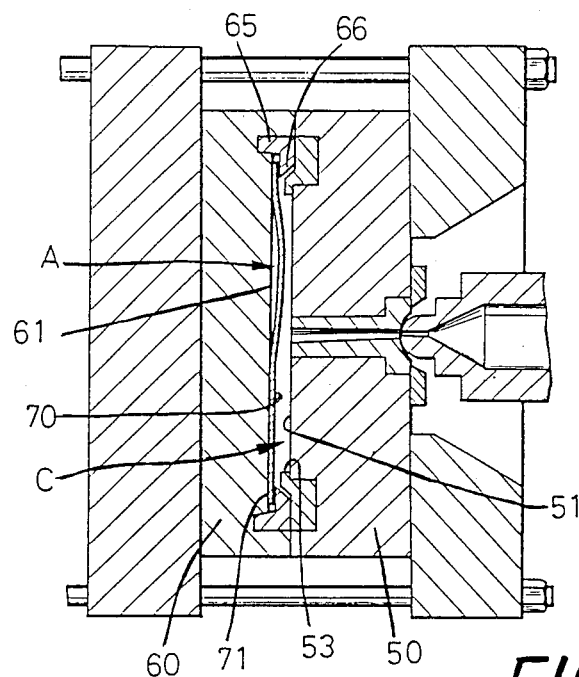
FIG. 7 is an elevational view in cross section of a known holder device for retaining a stamper in a mold assembly of an injection-molding machine.
Figure 8:
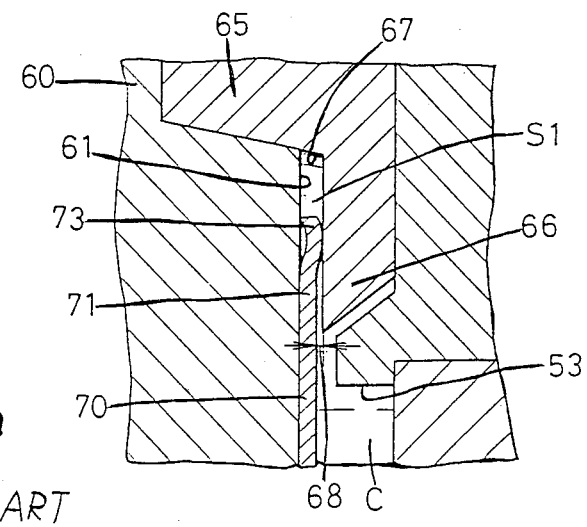
FIG. 8 is an enlarged, fragmentary view of the holder device of FIG. 7.

Referring to FIG. 6, there is illustrated a modified embodiment of the invention, wherein the suction space is formed along an inner peripheral edge of the stamper 98. In the interest of brevity and simplification, the same reference numerals as used in FIGS. 3-5 will be used in this modified embodiment, to identify the corresponding elements, and no further description of these elements will be provided.

In FIG. 6, reference numeral 130 designates an inner retainer ring in the form of a tapered sleeve disposed in a central portion of the movable die block 94, so as to extend through a central opening formed in the stamper 98. The inner retainer ring 130 has an integral flange portion 132 formed at one of opposite axial ends thereof, such that the flange portion 132 extends radially outwardly parallel to the stamper 98.

The radially outwardly extending flange portion 132 is adapted to cooperate with the mirror surface 104 to clamp the inner peripheral portion of the stamper 98 therebetween. Reference numeral 134 in FIG. 6 indicates an ejector pin for ejecting the formed product.

As shown in FIG. 6, a suction space in the form of a circumferential space 136 is formed between an outer circumferential surface of the inner retainer ring 130, and an inner circumferential surface of the movable die block 94, such that the space 136 communicates with the inner extremity of the mirror surface 104 on the movable die block 94. The circumferential space 136 is connected to suitable external suction means (not shown), via a plurality of radial communication holes 138 formed through the movable die block 94. Reference numeral 144 in FIG. 6 designates an O-ring disposed between the movable die block 94 and the inner retainer ring 130, to provide fluid tightness of the circumferential space 136.

In the thus constructed mold assembly, gases produced during injection into the mold cavity flow through a gap 140 between the flange portion 132 of the retainer ring 130 and the inner peripheral portion of the stamper 98, and enter into an annular void 142 to which the inner peripheral edge of the stamper 98 is exposed. However, the gases in the annular void 142 are rapidly sucked by the external suction means, through the circumferential space 136 and communication holes 138, and discharged into the atmosphere, so that the stamper 98 and the movable die block 94 are protected from an adverse influence of the gases. Thus, the instant embodiment provides substantially the same advantages as offered by the preceding embodiment.

The circumferential space 136 or similar suction space communicating with the inner peripheral portion of the stamper 98 may be provided in addition to a suction space such as the annular groove 106 as provided in the preceding embodiment, which communicates with the outer peripheral portion of the stamper 98. In this case, the removal of the gases produced within the mold assembly during the injection molding operation can be more effectively accomplished.

While the present invention has been described in its presently preferred embodiments for illustrative purpose only, it is to be understood that the invention is not limited to the precise details of the illustrated embodiments.

For example, the configuration of the annular void 8 of the first embodiment shown in FIGS. 1 and 2 may be suitably modified, provided that the void 8 accommodates the outer peripheral edge 32 of the stamper 30, so as to prevent the edge 32 from contacting the surface of the movable die block 20, even if the outer peripheral portion 32 of the stamper 30 has a warpage, buckling or burr which was caused during its manufacture.

In the second embodiment of FIGS. 3-5, the suction space connected to the external vacuum source is provided in the form of the annular groove 106 formed in the mirror surface 104 of the movable die block 94. However, the position of the suction space provided according to the invention may be suitably selected. For example, the suction space may be formed so as to communicate with the annular void 126 defined between the outer retaining ring 102 and the movable die block 94.

Also in the second embodiment, the positioning of the movable die block 94 with respect to the movable holder member 99 is facilitated by the provision of the circumferential air passage 114 at the interface of the two members 94, 99 to connect the annular groove 106 to the vacuum source through the passage 114. However, the circumferential passage 114 is not essential. Further, the communication holes (116, 118) for connecting the suction space (106) to the external suction pipes (120) may be formed so as to extend through the movable die block 94 in its axial direction, or through the outer retainer ring 102.

While the third embodiment employs the suction space in the form of the circumferential space 136 formed between the inner retainer ring 130 and the movable die block 94, the suction space may be formed so as to open in the inner peripheral portion of the mirror surface 104 of the movable die block 94. In this case, the suction space also serves as a sucker for retaining the stamper 98 on the mirror surface 104 by a sucking pressure.

It will be understood that the present invention may be embodied with various other changes, modifications and improvements, which may occur to those skilled in the art, without departing from the spirit and scope of the invention defined in the following claims.

What is claimed is:

1. A mold assembly for an injection-molding machine for molding a disc, including a stationary die, a movable die movable relative to said stationary die, a stamper which is retained at least at an outer peripheral portion thereof on said movable die and which has information signals recorded thereon, and an outer retainer ring for retaining said stamper on said movable die at said outer peripheral portion, said stationary die, said stamper and said outer retainer ring cooperating to define a mold cavity, so that said disc is molded of a resin material injected into said mold cavity, such that said information signals are reproduced on one surface of the molded disc, wherein the improvement comprises:

portions defining an annular void in which an outer peripheral edge of said outer peripheral portion of said stamper is accommodated without contact with said movable die and said outer retainer ring.

2. A mold assembly according to claim 1, wherein said portions defining an annular void comprise a flange portion of said outer retainer ring for holding said outer peripheral portion of said stamper, and a part of said movable die aligned with said flange portion of said outer retainer ring.

3. A mold assembly according to claim 2, wherein said flange portion has an annular groove formed in an inner surface thereof facing said part of said movable die, while said part of the movable die has an annular recess which cooperates with said annular groove to define said annular void.

4. A mold assembly for an injection-molding machine for molding a disc, including a stationary die, a movable die movable relative to said stationary die, a stamper which is retained at least at an outer peripheral portion thereof on said movable die and which has information signals recorded thereon, and an outer retainer ring for retaining said stamper on said movable die at said outer peripheral portion, said stationary die, said stamper and said outer retainer ring cooperating to define a mold cavity, so that said disc is molded of a resin material injected into said mold cavity, such that said information signals are reproduced on one surface of the molded disc, wherein the inprovement comprises:

portions defining an annular void in which an outer peripheral edge of said outer peropheral portion of said stamper is accommodated without contact with said movable die and said outer retainer ring;

means for defining a suction space which communicates with said annular void; and means for connecting said suction space to external suction means.

5. A mold assembly according to claim 4, wherein said means for connecting said suction space to external suction means comprises at least one passageway formed through said movable die.

6. A mold assembly according to claim 5, wherein said movable die comprises a movable die block on which said stamper is retained, and a movable holder member for holding said movable die block, said at least one passageway including an annular air passage formed at an interface of said movable die block and said movable holder member, and at least one communication hole which communicates with said suction space and said annular air passage.

7. A mold assembly according to claim 4, wherein said suction space comprises an annular groove formed in a surface of said movable die on which said stamper is retained, and said means for connecting said suction space to external suction means comprises at least one passageway formed through said movable die.

8. A mold assembly according to claim 7, wherein said annular groove is open in a part of said surface of said movable die such that said annular groove is closed by said outer peripheral portion of said stamper.

9. A mold assembly according to claim 8, wherein said suction space communicates with said annular void through a space between said movable die and said stamper retained on the movable die.

10. A mold assembly according to claim 4, wherein said stamper has a central opening, and said mold assembly further comprises an inner retainer ring for retaining said stamper on said movable die at an inner peripheral portion of said stamper.

11. A mold assembly according to claim 10, wherein said inner retainer rind comprises a sleeve disposed in a central portion of said movable die, so as to extend through said central opening in said stamper, said suction space comprising a circumferential space formed between an outer circumferential surface of said inner retainer ring and an inner circumferential surface of said movable die, said curcumferential space communicating with an inner periphery of said stamper.

12. A mold assembly according to claim 10, wherein said suction space comprises an annular groove formed in a surface of said movable die on which said stamper is retained.

13. A mold assembly according to claim 12, wherein said suction space further comprises a circumferential space formed between an outer circumferential surface of said innr retainer ring and an inner circumferential surface of said movable die.

* * * * *

UNITED STATES PATENT AND TRADEMARK OFFICE
CERTIFICATE OF CORRECTION

PATENT NO. : 4,795,127
DATED : January 3, 1989
INVENTOR(S) : Ikuo Asai

It is certified that error appears in the above-identified patent and that said Letters Patent is hereby corrected as shown below:

On the title page Item (73) assignee, "Kabushikik" should read --Kabushiki--.

Signed and Sealed this

First Day of August, 1989

Attest:

DONALD J. QUIGG

Attesting Officer

Commissioner of Patents and Trademarks